United States Patent [19]
Welander

[11] Patent Number: 4,711,137
[45] Date of Patent: Dec. 8, 1987

[54] MECHANICAL AUTOMATIC TRANSMISSION

[76] Inventor: Walter E. Welander, P.O. Box 449, Virginia, Minn. 55792

[21] Appl. No.: 809,206

[22] Filed: Dec. 16, 1985

[51] Int. Cl.$^4$ .............................................. F16H 3/74
[52] U.S. Cl. ...................... 74/751; 74/417; 74/423
[58] Field of Search .............. 74/710, 710.5, 711, 74/713, 417, 423, 751

[56] References Cited

U.S. PATENT DOCUMENTS

| | | | |
|---|---|---|---|
| 1,017,954 | 2/1912 | Cake | 74/713 |
| 1,937,002 | 11/1933 | Weihmann | 74/751 |
| 3,495,479 | 2/1970 | Rass | 74/751 |
| 4,435,995 | 3/1984 | Welander | 74/711 |

FOREIGN PATENT DOCUMENTS

| | | | |
|---|---|---|---|
| 40622 | 7/1932 | France | 74/751 |
| 244194 | 1/1926 | Italy | 74/751 |
| 501516 | 11/1954 | Italy | 74/751 |
| 566614 | 9/1957 | Italy | 74/751 |
| 500403 | 8/1938 | United Kingdom | 74/751 |
| 166569 | 12/1953 | United Kingdom | 74/751 |

Primary Examiner—Leslie Braun
Assistant Examiner—Dwight G. Diehl
Attorney, Agent, or Firm—Douglas L. Tschida

[57] ABSTRACT

Power transfer apparatus mountable intermediate a vehicular transmission and drive shaft comprising an input shaft spline mounted to one side of an inner split differential housing having a plurality of planetary gears rotatively mounted interiorly about the mating surfaces of the housing halves in engagement with a side gear. An output shaft mounted to the side gear rotatively extends through the differential housing at a bearing surface formed therein. Bearings journaled within a surrounding lubricant containing housing separately support the input and output shafts to rotate therein. Power is progressively transferred to the output shaft with the inability of the planetary gears to maintain pace with the input shaft.

5 Claims, 1 Drawing Figure

MECHANICAL AUTOMATIC TRANSMISSION

BACKGROUND OF THE INVENTION

The present invention relates to power transfer devices.

The primary object of the invention is to provide a geared transmission mechanism for transferring power without the aid of a conventional disc clutch.

This and other objects and advantages of the invention, as well as its construction, will become more apparent upon reference to the description thereof relative to the appended drawing.

DESCRIPTION OF THE PREFERRED EMBODIMENT

Figure 1:
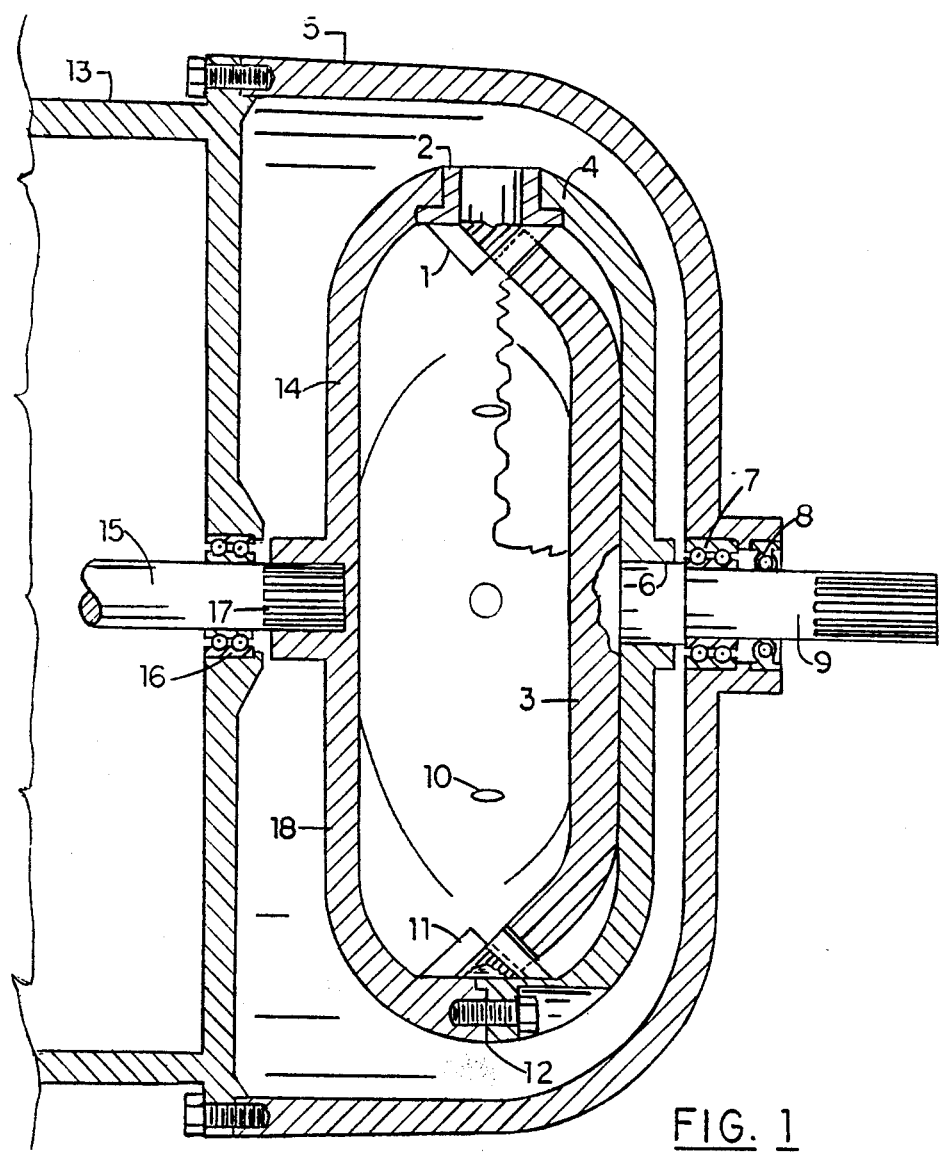
FIG. 1 shows a top elevation view in cross-section of the invention relative to an input transmission.

Turning attention to FIG. 1, a cross-section view is shown of the invention, looking at it from its top and relative to the housing (13) of an associated mechanical transmission coupled to the vehicle engine (not shown). A drive shaft (not shown) would also typically be coupled to the output and/or right side of the intermediate differential mechanism of the present invention.

The present differential mechanism is surrounded by an outer lubricant containing housing (5) which is bolted to the transmission housing (13) at an input shaft (15) containing end thereof. The input shaft (15) is rotatively mounted to the outer housing (5) via bearings (16) journaled therein. An output shaft (9) is similarly rotatively mounted to the outer housing (5) via bearings (7) and (8) journaled therein at an opposed side.

Interiorly of the outer housing (5), the input shaft (15) is coupled via a splined connection (17) to one side of a differential housing comprised of mating concave halves (4) and (14) which are bolted to one another at their right and left lateral end surfaces or at the lateral midline of the differential housing. The output shaft (9), in turn, is mounted to rotatively extend from the opposed side of the differential housing at a bearing surface (6) in further support of the differential housing relative to the outer housing (5). Thus, the differential housing is rotatively suspended within the outer housing (5), with input power being supplied from the input shaft (15) and transferred to the output shaft (9).

Figure 2:
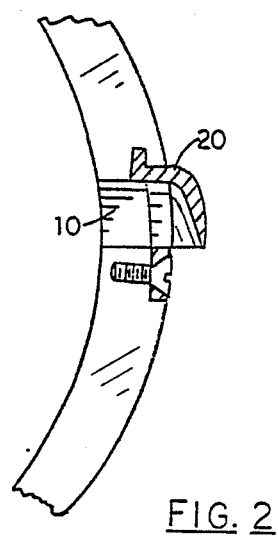
FIG. 2 shows a cross-section view through one of the oil dippers.

Mounted in transverse rotative relation about the mating surfaces of the differential housing halves (4) and (14) are a number of relatively small differential or planetary gears, two diametrically opposed ones (1) and (11) of which are shown. Each planetary gear (1) and (11) is rotatively mounted within a bushing (2) secured between the mating housing halves (4) and (18). Also provided about the mating housing surfaces are a number of openings (10) wherein oil dippers 20 (see also FIG. 2) are secured to extend approximately one-fourth inch therefrom in lubricating communication with the lubricant that is typically contained within the housing (5).

Mounted interiorly of the differential housing (5) at the inner end of the output shaft (9) in intermeshed relation to each of the planetary gears (1) and (11) is a relatively large concave side gear (3). That is, the diameter and number of teeth of the side gear (3) is substantially greater than those of each of the planetary gears (1) and (11). The side gear (3) is particularly supported by the output shaft (9) in rotational relation to the differential housing at a bearing surface (6) formed therein.

With the above mounting arrangement of the outer housing (5) to the input and output shafts (15) and (9), planetary gears (1) and (11) and the side gear (3), the induced rotation of the differential housing via the input shaft (15) causes the side gear (3) and output shaft (9) to rotate by way of the meshed linkage with the planetary gears. The speed of relative rotation of the input shaft (15) to the output shaft (9) and the power transferred, particularly, depends upon the inability of the planetary gears to keep pace with and rotate independently of the side gear (3), with greater amounts of power being transferred as the input shaft (15) rotates faster. That is and as explained in my prior U.S. Pat. No. 4,435,995, although relative to a different combination of gearing, as the differential housing (14) turns faster, the planetary gears (1) and (11) are not able to rotate fast enough to maintain pace in the differential housing as it rotates about the side gear (3). Instead, as the housing speed increases, the planetary gears in relative terms become more and more stationary, and increasingly induce the rotation of the side gear (3). More and more power is thus transferred to the output shaft (9) as the input shaft speed increases, until the point is reached where the input and output shafts (15) and (9) rotate at the same speed.

Consequently, it is to be appreciated that over a range of input shaft speeds the present differential mechanism progressively transfers power to the output shaft (9), much in the fashion of and in lieu of a conventional disk clutch. This transfer of power is maintained without load induced slippage via the momentum of the differential housing and the relatively large gear ratio that exists between the side gear (3) and planetary gears (1) and (11), along with the friction of the planetary gears, which must be overcome before slippage can occur.

While the invention has been described with respect to its presently preferred embodiment, it is to be appreciated that modifications may be made thereto without departing from the spirit and scope of the invention. Accordingly, the following claims should be interpreted to include all those equivalent embodiments within the spirit and scope thereof.

What is claimed is:

1. Power transfer apparatus comprising:
   (a) a first lubricant containing housing:
   (b) a second housing rotatively mounted in said first housing including a pair of concave mating halves joined together to form a hollow interior cavity;
   (c) an input shaft rotatively journaled through said first housing and spline coupled to one side of said second housing;
   (d) a plurality of planetary gears rotatively mounted to project interiorly of said second housing;
   (e) a side differential gear of a diameter substantially the same as said second housing and including a plurality of teeth mounted in intermeshed engagement with each of said planetary gears; and
   (f) an output shaft fixedly coupled to said side differential gear and rotatively journaled through said first and second housings.

2. Apparatus as set forth in claim 1 including a plurality of bearings journaled into said first housing and supporting said input and output shafts.

3. Apparatus as set forth in claim 1 including a plurality of oil dippers and planetary gear supporting bushings mounted to said second housing at the mating surfaces of said halves.

4. Power transfer apparatus comprising:
(a) a first lubricant containing housing;
(b) a second housing rotatively mounted in said first housing including a pair of concave mating halves joined together to form a hollow interior cavity;
(c) an input shaft extending through said first housing, rotatively supported in a first bearing mounted therein and spline coupled to one side of said second housing;
(d) a plurality of planetary gears rotatively mounted in a plurality of bushings secured between the mating halves of said second housing to project interiorly of said second housing;
(e) a concave side differential gear of a diameter substantially the same as said second housing and including a plurality of teeth mounted in intermeshed engagement with each of said planetary gears; and
(f) an output shaft fixedly coupled to said side differential gear and extending through said first and second housings in rotatively supported relation to second and third bearings at said first and second housings.

5. A power transfer apparatus comprising:
(a) a first lubricant containing housing;
(b) a second housing rotatively mounted in said first housing including a pair of concave mating halves joined together to form a hollow interior cavity;
(c) an input shaft extending through said first housing, rotatively supported in a first bearing mounted therein and spline coupled to one side of said second housing at a longitudinal center axis thereof;
(d) a plurality of planetary gears rotatively mounted in a plurality of bushings secured between the mating halves of said second housing to project interiorly of said second housing;
(e) a plurality of oil dippers mounted between the mating halves of said second housing to project in flow communication with the lubricant in said first housing
(f) a concave side differential gear of a diameter substantially the same as said second housing and including a plurality of teeth mounted in intermeshed engagement with each of said planetary gears; and
(g) an output shaft coaxially aligned with said input shaft, fixedly coupled to said side differential gear and extending through said first and second housings in rotatively supported relation to second and third bearings at said first and second housings.

* * * * *